Dec. 3, 1968 K. R. MEISINGSET ET AL 3,414,671
APPARATUS FOR CHECKING THE ADVANCEMENT OF
THE TAPE IN A TAPE READER
Filed Oct. 16, 1963
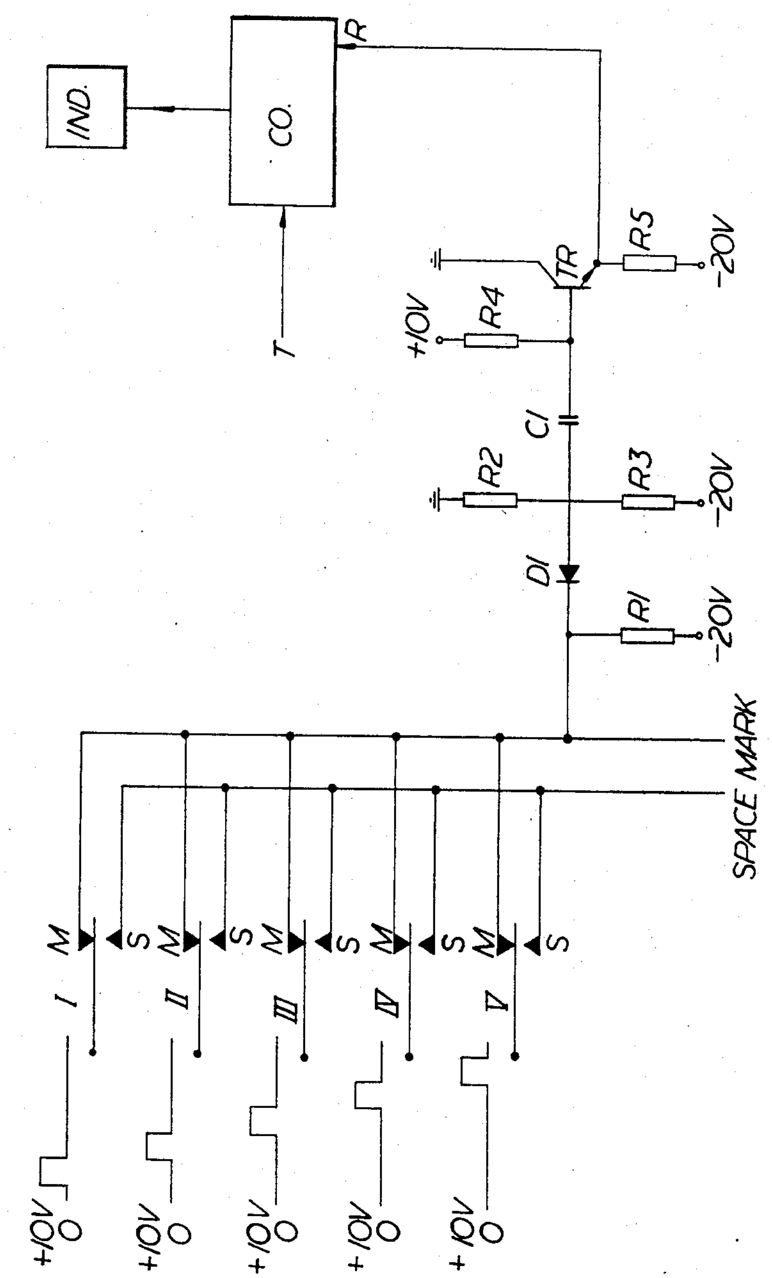
Inventors
KAARE R. MEISINGSET
TERJE THAULAND
ODD KVINGEDAL
IVAR MO
By Percy P. Lantzy
Attorney United States Patent Office 3,414,671

Patented Dec. 3, 1968

3,414,671

APPARATUS FOR CHECKING THE ADVANCEMENT OF THE TAPE IN A TAPE READER

Kaare R. Meisingset, Stabekk, Terje Thauland, Ronde, Odd Kvingedal, Oslo, and Ivar Mo, Veitvet, Norway, assignors to International Standard Electric Corporation, New York, N.Y., a corporation of Delaware Filed Oct. 16, 1963, Ser. No. 316,656

3 Claims. (Cl. 178—42)

ABSTRACT OF THE DISCLOSURE

A tape feed check arrangement, wherein the detection of the transitions from no hole to hole and vice versa, occurring in any one of the character element positions of a perforated tape, is used for resetting a counting device which is triggered in synchronism with the tape advance arrangement.

The present invention relates to apparatus for checking the advancement of the tape in a tape reader, and in particular for checking the advancement of fully perforated or "chad-less" teleprinter tape in a tape reader.

When reading a perforated tape in a tape reader, it is essential to have a continuous check on the advancement of the tape. If the feed holes are torn so that the tape advancement arrangement is unable to advance the tape, or if the advance arrangement is failing, considerable trouble occurs in the reading operation.

In order to check the advancement therefore, many approaches have been suggested and utilize a plurality of arrangements. Some of these arrangements employ direct reading of the feed holes, using photo-electric or mechanical reading means. Other arrangements employ mechanical means, such as an additional sprocket wheel or a "clamping" device which is moved with the tape and released in a reciprocating manner, for checking the tape advancement.

All of these known mechanical arrangements have, however, a disadvantage in that some mechanical gadget is used directly in contact with the tape, thereby increasing the possibility of damage to the tape.

In the case of a photo-electric tape advancement check, it is very difficult to obtain a reliable reading of the feed hole at all times. This is due to the fact that the feed hole is smaller than the character element holes, and that the hole/no hole and no hole/hole transitions are not in line with the corresponding transitions of the character element holes.

It is the object of the present invention to overcome the above mentioned drawbacks found in known tape advancement check arrangements. An advantage according to the invention is that in ordinary text, at the reading positions, there will always be at least one character element position in which a mark, or a hole occurs. Namely, a no hole/hole transition and vice versa always occurs when the tape is advanced.

Only when the tape is not advanced or when a cipheral tape contains the character "ALL SPACE" is the said transitions absent. However, even in a random key tape used for crytographic purposes, the character "ALL SPACE," or any one of all the other 31 characters (in ordinary 5-element teleprinter code) is not allowed to repeat in a successive series for more than a predetermined number of times.

The main feature of the present invention is that any transition from hole to no hole, or from no hole to hole, occurring at any one of the character element reading positions, is used to reset a counting device or a time delay device which is stepped forward or triggered in synchronism with the tape advance arrangement.

A further feature of the invention is that the counting device upon reaching a predetermined number actuates an indicating device or an alarm device. The preceding predetermined number of character periods comprise character periods during which the tape has not been advanced.

Another feature of the invention is that the predetermined highest number is chosen larger than the number of successive "ALL SPACE"-characters found in a random key used in connection with cryptographic equipment.

The present invention may be used in connection with automatic equipment, in which the advancement of the tape is controlled by a clock pulse generator, or it may be used with manually or keyboard controlled equipment. It is, however, not good to use a time delay device in connection with manually or keyboard controlled equipment because the time delay period will also include the time intervals between characters.

A still further feature of the invention is that when the time delay device is not reset for a predetermined time period, it actuates an indicating device for indicating that during said predetermined time period the tape has not been advanced.

Still another feature of the invention is that the said predetermined time period is chosen larger than a time period corresponding to the number of successive "ALL SPACE"-characters which are allowable in a random key tape used in connection with cryptographic equipment.

The said time delay device may be a mono-stable electronic circuit, a slow relay and the like.

The arrangement according to the present invention may be used in connection with most types of tape readers, e.g. mechanical, photo-electric or pneumatic.

However, the type of mechanical tape readers in which the sensing elements are mechanically lifted away from the tape during tape advancement must be provided with a tape advancement check of conventional design.

In a preferred embodiment of the present invention an electronic counter is used, but it is also possible to use other types of counters, such as an electro-magnetic counter having electrical reset facilities.

An embodiment of the invention will in the following be described in detail in connection with the drawing.

The drawing shows a tape reader of the same type as is described in U.K. Patent No. 784,530 (K. R. Meisingset-2), having mechanical sensing elements which during tape advancement, is solely controlled by the tape.

The five change-over contacts are all shown in mark position M in which the ends of the movable contacts protrude through holes in the tape. In a space position S corresponding to no hole, the movable contact is pushed down by the tape into contact with the lower set of contacts.

As shown, each of the five movable contacts is supplied with pulses being displaced with respect to each other, so as to provide a reading on the conductors designated SPACE and MARK, of each read character. This procedure is described in detail in the said U.K. Patent No. 784,530 and is not an object of the present invention.

As shown in the drawing, a pulse shaping means comprising a transistor TR with associated components (R1–R5, C1, D1) is connected to the MARK-conductor. When the tape (not shown) is stepped from one character position to another, all of the movable contacts which are not in a space or no-hole position are pushed down by the tape to the lower set of contacts. At that moment, the transistor is triggered so as to produce a negative reset pulse on the R-conductor.

The counter CO is supplied with trigger pulses via the conductor T, in synchronism with the tape advance arrangement. As long as the tape is advanced and all movable contacts are brought to their space position each time the tape is advanced, the transistor circuit provides the counter CO with a reset pulse. The counter begins counting ONE—is reset—counts ONE again and is again reset.

Only when reset pulses fail to arrive to the counter, will the counter count 1–2–3 . . ., indicating a corresponding number of preceeding character periods during which the tape has not been advanced.

It should be borne in mind that the tape advance arrangement usually is a sprocket wheel in engagement with the tape feed holes, but if the feed holes are torn, the engagement is broken, so that the advance arrangement operates without advancing the tape. In most tape readers the sprocket wheel is operated by an electromagnet relay receiving operating current from a pulse generator. Pulses in synchronism with the operating pulses to said relay are applied to the counter CO via the conductor T. Another situation which might occur is that the advancement sprocket wheeel is not properly stepped by its operating mechanism, the mentioned electromagnet relay or that said relay is disabled in some way or other. It is of course assumed that the pulse generator still operates.

As the tape reader may be used to read random key tape, when used in connection with cryptographic equipment, the character "ALL SPACE" may occur, and in this case the reset pulses will not be produced. This is provided since only a limited number of successive equal characters are allowed in a random key tape, and the counter is set to trigger an indicating device IND, when the counter reaches a larger number than the said limited number.

It should be noted that the indicating device is not essential, as the counter output may be connected directly to the reading equipment so as to stop the reading process and the eventual transmitting of the read message whenever the said number is exceeded.

It should also be noted that the counter may be an electro-mechanical counter which is monitored by an operator, so that he can take the necessary steps if the said number is exceeded.

When the invention is used in connection with a photoelectric or pneumatic reader, it is assumed that these readers provide outputs in form of electrical pulses and that these pulses may be used directly or via pulse shaping means to reset the counter. Detailed descriptions of such embodiment are therefore not considered necessary.

It is furthermore considered to be obvious that the transistor circuit shown in the drawing may be replaced by any circuit performing the same operations.

We claim:

1. Apparatus for checking the advanceemnt of a perforated tape in a tape reader, comprising:

means for sensing, during tape advancement, any transition from hole to no-hole, or from no-hole to hole occurring at any one of the character element reading positions, said sensing means including mechanical change-over contacts movable between a mark and space position depending on the perforations in said tape;

responsive means including a pulse shaping circuit having its input coupled to said change-over contacts for deriving an output reset pulse corresponding to any sensed transition of said contacts;

a source of triggering pulses;

a counter coupled to be advanced by said triggering pulses and coupled to the output of said pulse shaping circuit to be reset by said reset pulse; and an indicating device coupled to the output of said counter, whereby when said counter has been advanced by a predetermined number of triggering pulses, without having been reset by any sensed transition of said contacts, said device is actuated.

2. Apparatus according to claim 1, wherein the mark or space side of all the change-over contacts are connected to the input of said pulse shaping circuit.

3. Apparatus according to claim 2, wherein said pulse shaping circuit includes a transistor the output of which produces, during cut-off, the reset pulse applied to said counter.

References Cited

UNITED STATES PATENTS

| | | | |
|---|---|---|---|
| 2,770,675 | 11/1956 | Johnston et al. | 178—17.5 |
| 2,860,182 | 11/1958 | McCreary | 178—17.5 |
| 3,264,630 | 8/1966 | Conklin | 340—259 |
| 2,142,880 | 1/1939 | Anderson et al. | 178—42 X |
| 2,351,229 | 6/1944 | Potts | 178—42 |
| 3,019,346 | 1/1962 | Laycak | 179—100.2 |

THOMAS A. ROBINSON, *Primary Examiner.*